United States Patent
Espinasse et al.

(10) Patent No.: US 6,840,286 B2
(45) Date of Patent: Jan. 11, 2005

(54) FLEXIBLE TUBULAR PIPE

(75) Inventors: Philippe Espinasse, Bihorel (FR); Patrice Joël Louis Jung, La Mailleraye sur Seine (FR)

(73) Assignees: Coflexip (FR); Institut Francais du Petrole (FR)

(*) Notice: Subject to any disclaimer, the term of this patent is extended or adjusted under 35 U.S.C. 154(b) by 0 days.

(21) Appl. No.: 10/432,521

(22) PCT Filed: Nov. 12, 2001

(86) PCT No.: PCT/FR01/03524

§ 371 (c)(1),
(2), (4) Date: Nov. 24, 2003

(87) PCT Pub. No.: WO02/42674

PCT Pub. Date: May 30, 2002

(65) Prior Publication Data

US 2004/0074553 A1 Apr. 22, 2004

(30) Foreign Application Priority Data

Nov. 24, 2000 (FR) .................................. 00 15203
Jan. 25, 2001 (FR) .................................. 01 01010

(51) Int. Cl.$^7$ .................................. F16L 11/00
(52) U.S. Cl. ................. 138/135; 138/136; 138/150
(58) Field of Search .................. 138/135, 136, 138/134, 129, 150

(56) References Cited

U.S. PATENT DOCUMENTS

| 916,890 | A | * | 3/1909 | Rubes | 138/131 |
|---|---|---|---|---|---|
| 2,022,694 | A | * | 12/1935 | Stone | 138/131 |
| 4,838,317 | A | * | 6/1989 | Andre et al. | 138/135 |
| 5,669,420 | A | * | 9/1997 | Herrero et al. | 138/135 |
| 6,145,546 | A | | 11/2000 | Hardy et al. | |
| 6,668,867 | B2 | * | 12/2003 | Espinasse et al. | 138/135 |

FOREIGN PATENT DOCUMENTS

| FR | 2654795 | 5/1991 |
|---|---|---|
| FR | 2782142 | 2/2000 |
| FR | 2784445 | 4/2000 |
| FR | 2808070 | 10/2001 |
| GB | 1081339 | 8/1967 |

OTHER PUBLICATIONS

International Search Report, Jun. 17, 2002.
Specification for Unbonded Flexible Pipe—American Petroleum Institute Exploration and Production Departmet API Specifiction17J First Edition, Dec. 1996 Effective Date: Mar. 1, 1997.

* cited by examiner

Primary Examiner—James Hook
(74) Attorney, Agent, or Firm—Ostrolenk, Faber, Gerb & Soffen, LLP

(57) ABSTRACT

A flexible tubular pipe comprising at least one metal profile spiralled in a helix about a longitudinal axis of the flexible pipe. The profile consists of a metal strip, each turn of which comprises two separate box sections which are obtained by bending the said strip so that the free edges of the strip are turned down between the two box sections and are in contact with a strip portion provided on an upraised bulge formed between the two box sections. The contact portion ties approximately along the neutral fiber of the profile. Each box section has a trapezoidal shape. Connectors above or below the profile connect windings. The edges of the connectors extend into the bulges. Profiling or extra elements are provided for the connectors.

14 Claims, 4 Drawing Sheets

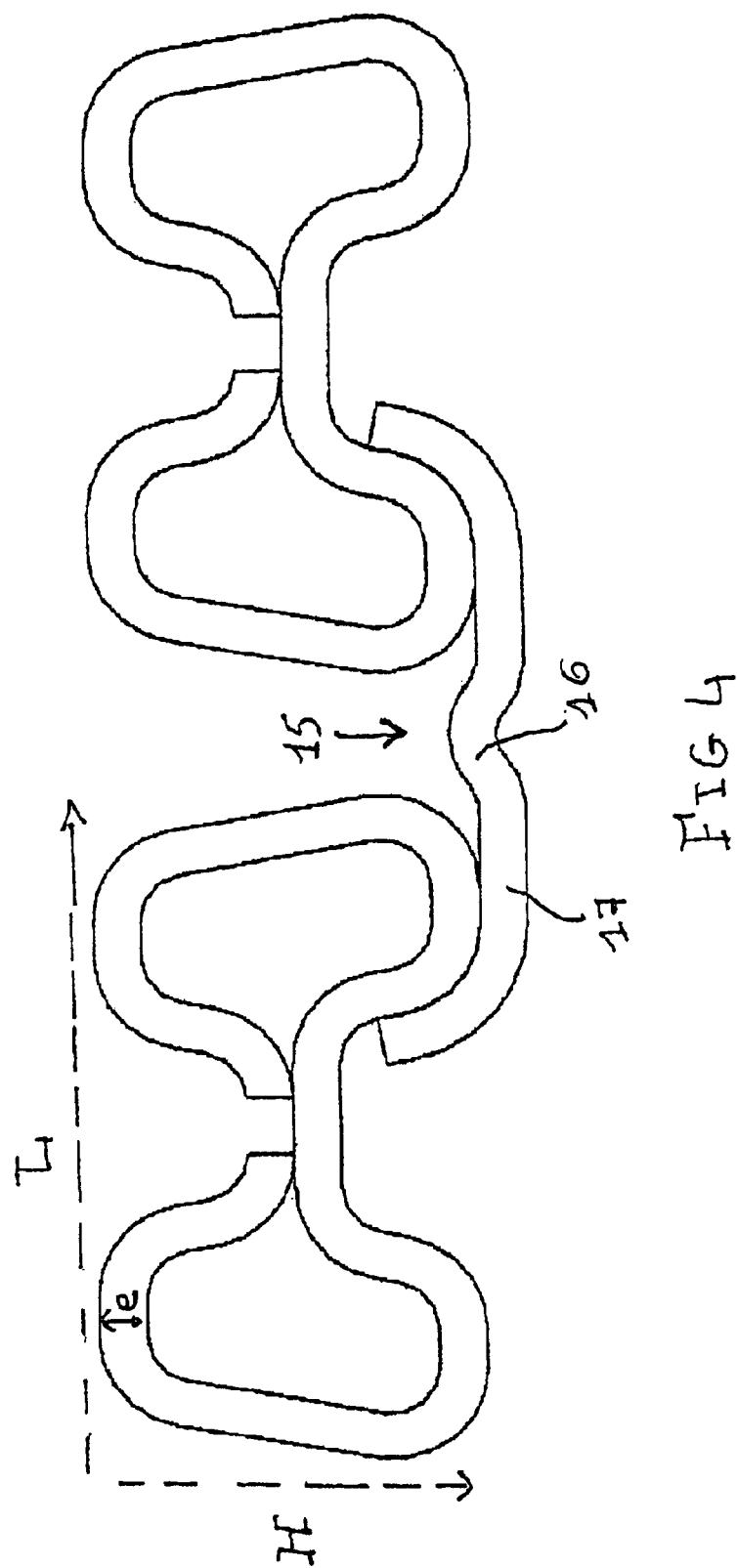

FLEXIBLE TUBULAR PIPE

BACKGROUND OF THE INVENTION

The present invention relates to a flexible tubular pipe which can be preferably used in deep-sea applications, for depths of between 1000 and 3000 m, although it can also be used for depths of less than 1000 m. Such flexible tubular pipes are used in subsea oil production installations for transporting fluids such as hydrocarbons.

Several types of flexible tubular pipes are used at the present time and are described in API (American Petroleum Institute) 17 J. In certain flexible pipes, there is a pressure vault which consists of a helical winding with a short pitch of a shape to wire which may be self-interlockable or interlockable by means of a fastener. Likewise, the metal carcasses used in flexible pipes called "rough bores" are formed from a crush-resistant doubly interlocking profiled metal strip.

In all cases, it has been attempted to improve the moment of inertia/weight ratio of the interlocked strips or shaped wires used for producing the various metal layers of the flexible pipes.

For deep-sea applications and in the case of pressure vaults, the reinforcing wires must have a high moment of inertia in order to withstand the external pressure and a low weight in order to reduce the total weight of the flexible pipe so as to improve the performance of the pipelaying means and allow the flexible pipe to be self-supporting.

Several solutions have been proposed.

A first solution has consisted in using a shaped wire, the cross-section of which is in the form of an I, as described in FR-A-2 782 142. Such a shaped wire has an acceptable moment of inertia/weight ratio but the manufacturing cost is very high because of the fact that it is obtained by rolling or wire drawing.

The profiles shown in the figures must not exceed a certain width L so that the hollow profile can be wound helically. This is because if the profile is too wide, during winding the forces will be too high and there would be a risk of melting the side walls of the profile buckle. The profile must therefore have a maximum width L which depends, on the one hand, on the thickness e of the strip and, on the other hand, on the height H of the profile. Tests carried out have shown that the results are satisfactory when:

$0.5 < L/H < 4$;

$L/e > 20$

In Patent FR 2 665 237 it is recommended to produce a tubular metal carcass comprising at least one box section wound in a helix with a short pitch, the said metal carcass being obtained by means of two complementary profiled strips wound helically with a short pitch. Many examples of profiled strips are described and shown in that document, some of which, such as for example those in FIGS. 8 and 9, consisting of a strip in the form of an elongated S and having a box section at a first end and an upwardly curved fastening edge at the other end, the fastening edge penetrating a dish formed by the box section and the transverse bar of the S of the preceding turn. The curved fastening edge may rest on the bottom of the dish (FIG. 9) or it may not be in contact with the said bottom (FIG. 8).

It should be noted that all the cross-sections of the box sections provided at one or both ends of each profiled strip are square or rectangular cross-sections.

Although such box-section profiled strips have been satisfactory, they have been found to have certain drawbacks. When one considers that a box section is formed by parts of the same turn of the profiled strip and comprises an upper wall, a lower wall and side walls and when an external force is applied to one of the upper and/or lower walls, such as a compressive or crushing force or else a force generated by the pressurized fluid, buckling of the side walls or faces and/or the upper or lower walls of the box section may then occur, thereby reducing, at least locally, the crush resistance of the internal carcass.

For forces or pressures exceeding a certain value, buckling of the side walls of the box section occurs.

For lower forces or pressures and when the side walls are not strictly perpendicular to the upper and lower walls of the box section, crushing of the said box section may occur, resulting in the side walls moving further apart or closer together (opening or closing of the box section). To prevent this opening or closing phenomenon, it has been recommended in certain cases such as, for example, in FR 2 665 237 to weld one end of the box section at one point on the strip. However, such a solution increases the manufacturing cost and it is difficult to implement.

In a prior embodiment, the box-section strip adopts the shape of a pair of spectacles. This profile is produced from a strip whose free edges are welded to this same profile so as to give the profile good stability for laying. However, the welding operation is difficult to implement and considerably increases the manufacturing cost. Because the welds are off-centre with respect to the neutral fibre of the profile (at the radial position where it is neither compressed nor stretched during winding), they are subjected to high stresses during the spiralling. This may result in a local fracture of the weld. Such a fracture of the weld may, in turn, result in a considerable reduction in the mechanical performance of the pressure vault, of around 10 to 30%, because of the fact that the profile is no longer stable.

In another prior embodiment, the spectacles-shaped profile is similar but produced from two tubes, of square cross-section, the said tubes being joined together by a strip which is welded to these tubes. The welding operations again considerably increase the manufacturing cost.

In addition, these various shapes of the profile do not make it possible to limit the creep of an adjacent sealing sheath. It is sought to prevent such creep as far as possible, mainly in the case of the pressure vault. It should also be noted that no information is provided regarding the width/thickness ratio of the strip, although this has become important in order to ensure stability of the profile during pipe laying, so as to prevent the buckling effect.

This is because if the profile has too large a width with respect to its thickness, the side walls of the box section will buckle during spiralling or winding with a short pitch.

In French Patent No. 2 808 070, the profiles that are described give good results but sometimes have drawbacks, especially because of the great dissymmetry of the profile, this dissymmetry constituting an obstacle during spiralling, which is consequently difficult to carry out. In addition, the moment of inertia/pitch ratio is reduced by the presence of the free edge which provides little moment of inertia.

SUMMARY OF THE INVENTION

The object of the present invention is to provide a profile which makes it possible to simplify the spiralling operations while still having a high moment of inertia/pitch ratio, similar to that obtained with conventional shaped wires of equivalent height, and a high moment of inertia/weight ratio which is needed in particular for great depths.

The subject of the present invention is a flexible tubular pipe, of the type comprising at least one metal profile spiralled in a helix about a longitudinal axis (A—A) of the said flexible pipe and is characterized in that the profile consists of a metal strip, each turn of which comprises two separate box sections which are obtained by bending the said strip so that the free edges of the strip are turned down between the two box sections and are in contact with a strip portion provided on a bulge formed between the two box sections, the said contact portion lying approximately along the neutral fibre of the said profile (at the radial position where it is neither compressed nor stretched during winding), and in that each box section has a trapezoidal shape.

One advantage of the present invention lies in the fact that use is made of a metal strip which is not very costly and lends itself well to being bent in order to form separate box sections and thus to realize a profile which has a high moment of inertia, while still maintaining a high moment of inertia/weight ratio when the profile is used in particular for producing a pressure vault for large-depth applications. The bending of the free edges of the strip so as to come into contact with a strip portion lying approximately along the neutral fibre of the profile considerably increases the stability of the profile and makes it easier for it to be spiralled.

BRIEF DESCRIPTION OF THE DRAWINGS

Further features and advantages will become more clearly apparent on reading the description of several embodiments of the invention and the appended drawings in which:

FIG. 4 is a cross-sectional view of the profile interlocked with an improved fastener.

BRIEF DESCRIPTION OF PREFERRED EMBODIMENTS

Figure 1:
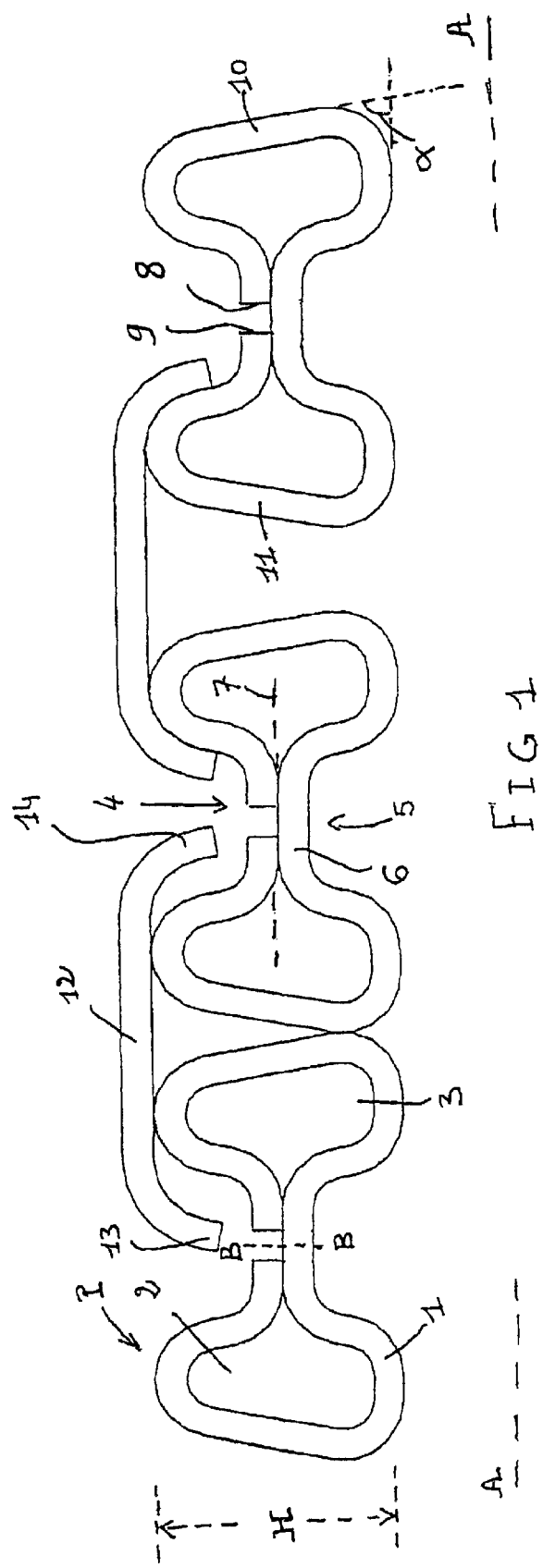
FIG. 1 is a cross-sectional view of part of the profile according to the invention, the profile being interlocked from above.
Figure 2:
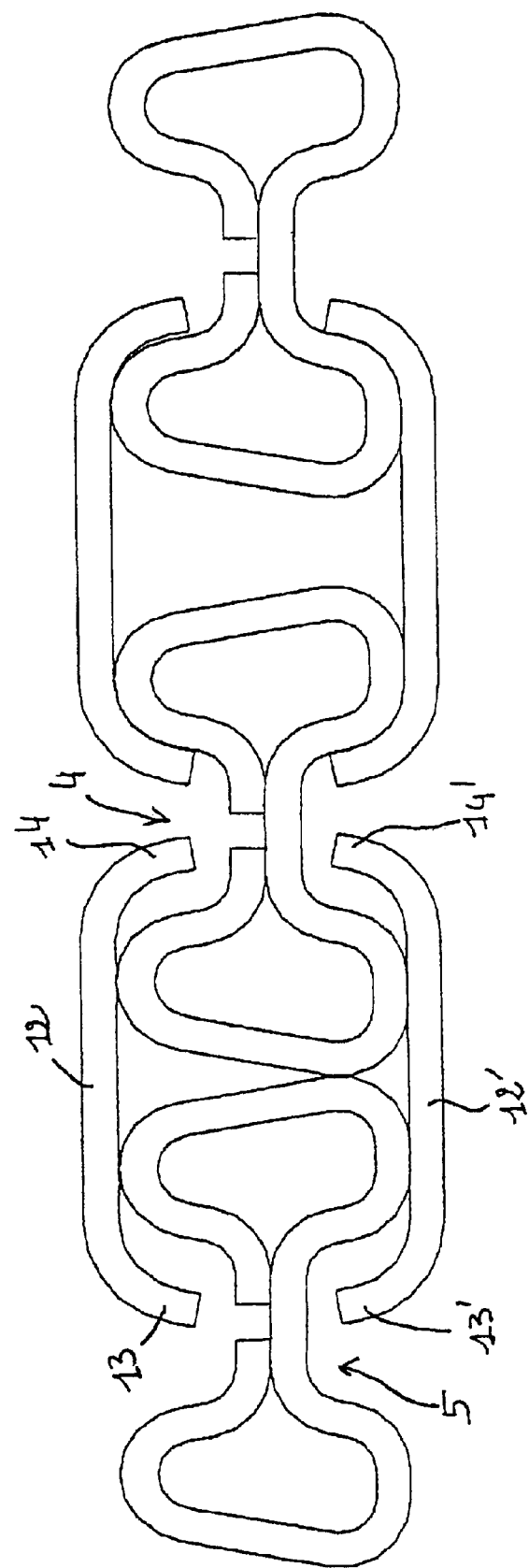
FIG. 2 is a cross-sectional view of part of the profile according to the invention, the profile being interlocked from above and below.

The profile P according to the invention shown in FIGS. 1 and 2 consists of a metal strip 1 which is bent so as to form two separate trapezoidal box sections 2, 3 which are symmetrical with respect to a vertical axis of symmetry B—B. The box sections 2, 3 are separated by a radially inwardly projecting upper bulge 4 and a radially outwardly projecting lower bulge 5. The strip portion 6 which constitutes the bottom of the lower bulge 5 lies approximately in the plane of the neutral fibre 7 (at the radial position where it is neither compressed nor stretched during winding) and the free edges 8, 9 of the strip which have been turned down inwards during the bending bear on said strip portion 6, with the free edges 8, 9 being aligned and placed opposite each other, as shown in the figures.

Each trapezoidal box section 2, 3 has side walls 10, 11 which are inclined and make an angle α greater than 60° and less than 90° with the horizontal C so that, owing to the effect of the contact pressures to which the profile is subjected, the free edges 8, 9 will have a tendency to move closer together, sliding over the contact strip portion 6, without any possibility of them overlapping each other, something which could result in deformation of the profile and therefore in destabilization. This is because, owing to the effect of the contact pressures developed in the flexible pipe and transmitted to the profile, the free edges 8, 9 can butt against each other, thereby preventing them from over-lapping each other and from further stabilizing the profile. Since the free edges 8, 9 are on the contact portion 6, which lies approximately in the plane of the neutral fibre 7 and therefore in an approximately central region of the profile, the said region will therefore be subjected to few stresses during spiralling and will not work very much. This greatly improves the stability and the performance of the profile.

For an angle α close to 90°, the profile is stronger and for an angle α close to 60° the profile is more stable. Consequently, the optimum angle α is a compromise between strength and stability.

The profile described above can be used for producing a pressure vault or the metal carcass, when the flexible pipe has one, by winding it in a helix, with a short pitch, about the horizontal axis A—A of the flexible pipe, each turn of the winding consisting of a pair of box sections 2, 3. Since the profile is not self-interlockable, it is possible to interlock the turns in several ways.

The first way of interlocking is shown in FIG. 1. In this embodiment, the turns of the winding of the profile are interlocked from above, that is to say the fasteners 12, for example in the form of an upside-down U, have their arms 13 and 14 placed in the consecutive upper bulges 4. Another method of interlocking, not shown, consists in using the same fasteners, but referenced 12', which have their arms 13' and 14' placed in the consecutive lower bulges 5. In the latter case, interlocking is obtained from below, as opposed to the previous way which is called interlocking from above.

Another method of interlocking, shown in FIG. 2, consists in interlocking the turns from above and from below, with upper fasteners 12 whose arms 13 and 14 are placed in the upper bulges 4 and lower fasteners 12' whose arms 13' and 14' are placed in the lower bulges 5.

Interlocking from below has the advantage of not inducing any stresses on the free edges 8 and 9.

As shown in FIG. 4, the upper and/or lower fasteners may advantageously have, in the interjoint space 15 between two consecutive turns, a bulge or hump 16 which makes it possible to increase the local moment of inertia of the fastener 17. The fastener, stiffened at the hump 16, is more resistant to the internal pressure of the fluid flowing in the flexible pipe. Creep of the inner sealing sheath, owing to the effect of the internal pressure, applies a high contact pressure on the fastener. Moreover, to improve the technical characteristics of the fastener 17, the radii of curvature of the hump 16 correspond to those of the profile so as to allow the functional clearances of the vault to be maintained. To increase the burst strength of the pressure vault owing to the effect of the internal pressure of the fluid flowing in the flexible pipe, it is possible to use the properties of the fastener 17. Since the resistance to the internal pressure depends in part on the cross-section and on the mechanical properties of the material used, all that is required is to increase the thickness of the fastener or to choose a material having high mechanical properties, preferably properties superior to those of the profile; the vault-fastener pair will have a higher burst strength.

Figure 3:
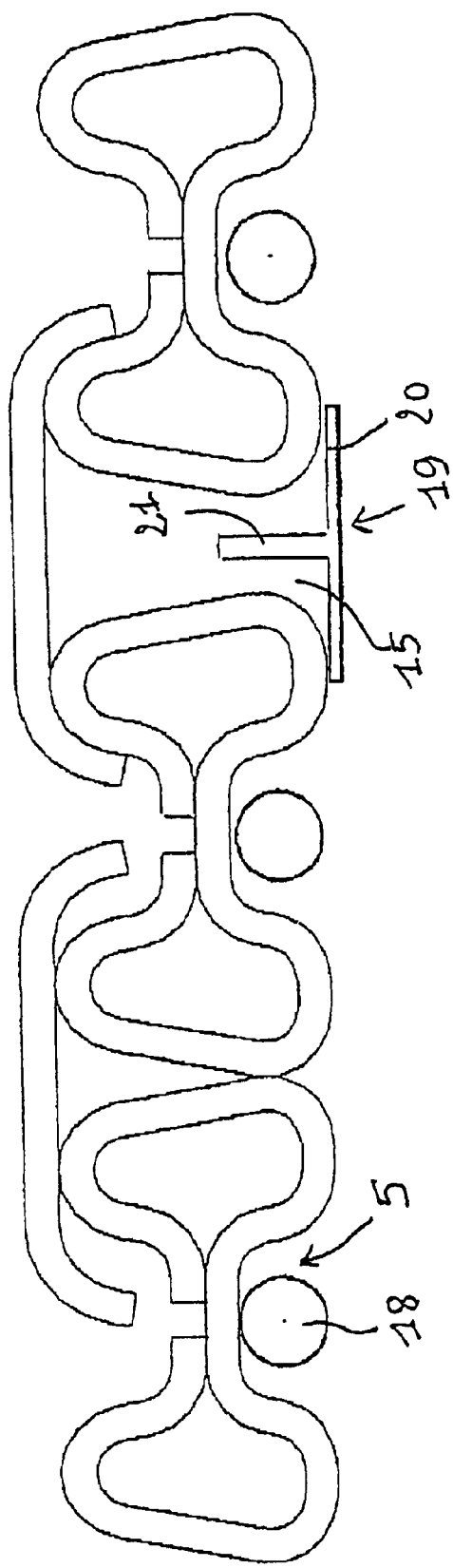
FIG. 3 is a cross-sectional view of part of the profile according to another embodiment.

It is also possible to use means for reducing the creep of an impermeable inner polymeric sheath which bears on the profile. As shown in FIG. 3, these means may comprise, by themselves or in combination, a rod 18, which is preferably placed in the lower bulges 5, and/or a shaped wire 19, which covers the interjoint space 15 between two consecutive turns. The shaped wire may be flat or have the shape of an inverted T 20, as shown in FIG. 3, the vertical arm 21 of the T 20 fitting into the interjoint space 15. The shaped wire 19 may also be an anti-creep woven strip like that described in FR 2 744 511. These means for reducing the creep of a sheath may be provided above the profile when it is interlocked from below and when the polymeric sheath is placed above the profile.

Another advantage lies in the fact that since the interlocking is carried out in the box section, the moment of inertia/pitch ratio of the profile is thus optimized while eliminating the regions of low moment of inertia.

The annulus of a flexible pipe is bounded by the outer sealing sheath and the inner sealing sheath. This annulus is generally at atmospheric pressure. When this annulus is invaded by sea water, as a result of a tear or perforation in the outer sealing sheath or when the latter does not exist, the hydrostatic pressure is applied directly to the inner sealing sheath. As a result, the contact pressures to which all the armour plies lying above the inner sealing sheath are subjected are reduced and, in this case, they will no longer have to withstand a large pressure differential and consequently no longer take up this force, which is transferred to the internal carcass. The armour plies will only have to take up the internal pressure of the fluid flowing in the flexible pipe, reduced by the hydrostatic pressure, together with the axial forces and the compression due to the tension.

The free edges 8, 9 are slightly apart from or in contact with each other, so as to limit the deformation of the profile when it is subjected to contact forces, or they may be joined together by a longitudinal weld, by a spot weld, by bolting or by crimping with a T-shaped fastener.

When the annulus is invaded by sea water, if the profile is impermeable (longitudinal seam weld), the hydrostatic pressure is applied to the outer surface of the profile and requires the latter to be designed so that it withstands a pressure differential. Since the two box sections of the profile each have a small volume, the crush resistance is increased compared with a single box section having a larger volume. When the profile is not impermeable, in the case of an immersed annulus, the water also invades the inside of the profile and the box sections of the profile are therefore no longer subjected to the hydrostatic pressure.

In addition, the upper and lower bulges reduce the risk of the upper and lower walls of the profile box sections bending.

The profiles shown in the figures must not exceed a certain width L so that the hollow profile can be wound helically. This is because if the profile is too wide, during winding the forces will be too high and there would be a risk of making the side walls of the profile buckle. The profile must therefore have a maximum width L which depends, on the one hand, on the thickness e of the strip and, on the other hand, on the height H of the profile. Tests carried out have shown that the results are satisfactory when:

$$0.5 < L/H < 4;$$

$$L/e < 20.$$

By producing a reinforcing wire from a strip according to the invention, a more compact profile-fastener pair is obtained, thereby optimizing the moment of inertia/winding pitch ratio. As a consequence, the performance of the pressure vault produced in one of the embodiments described above is increased. The measurements carried out show that, for a profile 20 mm in height and 3 mm in thickness, the moment of inertia/effective pitch ratio is 260 mm$^3$ whereas the same ratio for a box-section profile of the prior art, 20 mm in height and 3 mm in thickness, is 210 mm$^3$.

Production starts with a strip 2.5 mm in thickness and 120 mm in width. The strip is bent so as to obtain a profile 20.4 mm in height and 38 mm in width. The slopes of the side faces of the profile are 80° to the horizontal. With such dimensions, a moment of inertia/pitch ratio of 250 mm$^3$ is obtained.

As regards the moment of inertia/weight ratio of the profile according to the invention, it was found that this was 20% higher compared with known lightened profiles and 60% higher compared with shaped wires (zeta, teta). The present invention thus achieves two objectives, namely a reduced manufacturing cost and an increase in the moment of inertia/weight ratio for deep-sea use in which it is necessary to withstand high external pressures.

It should be noted that the rod 18 described above may consist of a plastic rod or a tube conveying a heat-transfer fluid, for active heating for example, or containing a power cable for active heating. The rod or tube placed in the bulges may also contain an optical fibre.

The conveying functions mentioned above, and relating in particular to active heating, the optical fibre, etc., may be incorporated directly into at least one of the box sections of the profile.

What is claimed is:

1. A flexible tubular pipe comprising:

at least one metal profile spiralled in a helix about a longitudinal axis of the flexible pipe, wherein:

the profile is comprised of turns of a helically wound metal strip, the strip has opposite free edges;

each turn of the strip comprises two separate box sections defined by the strip being bent so that the free edges of the strip are turned down between the two box sections, the strip is shaped to define a bulge up toward the turned down edges of the strip and the strip having a strip portion at the bulge, the free edges of the strip are in contact with the strip portion provided at the bulge formed between the two box sections, and the contact portion lies approximately along a neutral fiber of the profile.

2. Flexible pipe according to claim 1, wherein the free edges are turned down so as to be opposed to each other; the box sections are symmetrical with respect to a mid-axis of each turn that passes between the opposed free edges.

3. Flexible pipe according claim 1, wherein the side walls of each box section make an angle greater than 60° and less than 90° with the horizontal.

4. Flexible pipe according to claim 3, wherein each box section has a trapezoidal shape.

5. Flexible pipe according to claim 1, wherein the free edges are in contact with each other.

6. Flexible pipe according to claim 1, wherein the turned down free edges define a second inward bulge toward the strip portion, the pipe further comprising a fastener interlocking two consecutive turns of the profile wound in a helix, the fastener having ends which fit into the second bulge located above the free edges.

7. Flexible pipe according to claim 1, further comprising a fastener interlocking two consecutive turns of the profile wound in a helix, the fastener having ends which fit into the bulge.

8. Flexible pipe according to claim 6, further comprising a hump on the fastener and placed in an interjoint space between two consecutive turns of the profile.

9. Flexible pipe according to claim 1, wherein the turned down free edges define a second inward bulge toward the strip portion, the pipe further comprising a fastener interlocking two consecutive turns of the profile wound in a helix, the first fastener having ends which fit into the second bulge located above the free edges, and a second fastener having ends which fit into the bulge also interlocking two consecutive turns.

10. Flexible pipe according to claim 9, wherein each box section has a trapezoidal shape.

11. Flexible pipe according to claim 1, wherein the free edges are joined together.

12. Flexible pipe according to claim 1, further comprising a rod placed in the bulges.

13. Flexible pipe according to claim 1, further comprising an anti-creep device in an interjoint space (15) provided between two consecutive turns of the profile.

14. Flexible pipe according to claim 1, wherein each box section has a trapezoidal shape.

* * * * *

UNITED STATES PATENT AND TRADEMARK OFFICE
CERTIFICATE OF CORRECTION

PATENT NO. : 6,840,286 B2
DATED : January 11, 2005
INVENTOR(S) : Philippe Espinasse et al.

It is certified that error appears in the above-identified patent and that said Letters Patent is hereby corrected as shown below:

Title page,
Item [75], Inventors, should read
-- Philippe Espinasse, Bihorel (FR);
   Patrice Joël Louis Jung, Sur Seine (FR);
   Daniel Averbuch, Rueil-Malmaison (FR);
   François Dupoiron, Barentin (FR). --

Signed and Sealed this

Thirty-first Day of May, 2005

JON W. DUDAS
*Director of the United States Patent and Trademark Office*